United States Patent
Iwashita

(10) Patent No.: US 9,921,924 B2
(45) Date of Patent: Mar. 20, 2018

(54) INFORMATION PROCESSING DEVICE, PORT CONTROL METHOD, AND COMPUTER-READABLE RECORDING MEDIUM

(71) Applicant: FUJITSU LIMITED, Kawasaki-shi, Kanagawa (JP)

(72) Inventor: Naoya Iwashita, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 129 days.

(21) Appl. No.: 14/976,473

(22) Filed: Dec. 21, 2015

(65) Prior Publication Data
US 2016/0110270 A1 Apr. 21, 2016

Related U.S. Application Data

(63) Continuation of application No. PCT/JP2013/069328, filed on Jul. 16, 2013.

(51) Int. Cl.
*G06F 11/20* (2006.01)
*G06F 11/32* (2006.01)
*G06F 13/362* (2006.01)
*G06F 13/40* (2006.01)

(52) U.S. Cl.
CPC ...... *G06F 11/2005* (2013.01); *G06F 11/2007* (2013.01); *G06F 11/327* (2013.01); *G06F 13/362* (2013.01); *G06F 13/4068* (2013.01); *G06F 2201/85* (2013.01)

(58) Field of Classification Search
CPC .................. G06F 11/2005; G06F 11/2007
See application file for complete search history.

(56) References Cited

U.S. PATENT DOCUMENTS

| | | | | |
|---|---|---|---|---|
| 6,381,218 B1* | 4/2002 | McIntyre | ............ | G06F 11/3006 370/216 |
| 7,433,300 B1* | 10/2008 | Bennett | ............... | G06F 11/2005 370/216 |
| 8,873,369 B2* | 10/2014 | Ayandeh | ............. | H04L 41/0668 370/216 |
| 8,949,656 B1* | 2/2015 | Ninan | ................. | G06F 11/2005 714/4.1 |

(Continued)

FOREIGN PATENT DOCUMENTS

| | | |
|---|---|---|
| JP | 11-312058 | 11/1999 |
| JP | 2000-339105 | 12/2000 |

(Continued)

OTHER PUBLICATIONS

International Search Report with form PCT/ISA/210 (English Language Translation) mailed in connection with PCT/JP2013/069328 dated Oct. 29, 2013, Box No.V, 12PP.

(Continued)

*Primary Examiner* — Yolanda L Wilson
(74) *Attorney, Agent, or Firm* — Fujitsu Patent Center

(57) ABSTRACT

An information processing device includes a plurality of communication units and a processor. Each of the plurality of communication units has a plurality of ports and is replaceable. The processor is configured to execute a process. The process includes specifying an active port mounted on one of the communication units on which a faulty active port is also mounted and switching the active port specified at the specifying to a standby port.

5 Claims, 9 Drawing Sheets

(56) References Cited

U.S. PATENT DOCUMENTS

| | | | |
|---|---|---|---|
| 2002/0040411 A1 | 4/2002 | Iwatani et al. | |
| 2003/0140191 A1* | 7/2003 | McGowen | G06F 11/2005 710/302 |
| 2005/0021878 A1 | 1/2005 | Iwatani et al. | |
| 2005/0102557 A1* | 5/2005 | Davies | G06F 11/2005 714/11 |
| 2007/0067462 A1* | 3/2007 | Takeda | G06F 11/2007 709/227 |
| 2008/0239945 A1* | 10/2008 | Gregg | G06F 11/2005 370/217 |
| 2010/0088469 A1 | 4/2010 | Motonaga et al. | |
| 2012/0290750 A1* | 11/2012 | Kawaguchi | G06F 11/2005 710/74 |
| 2013/0294227 A1* | 11/2013 | Fukuzaki | G06F 11/2007 370/228 |
| 2014/0101384 A1 | 4/2014 | Motonaga et al. | |
| 2015/0160875 A1 | 6/2015 | Motonaga et al. | |

FOREIGN PATENT DOCUMENTS

| | | |
|---|---|---|
| JP | 2007-026038 | 2/2007 |
| JP | 2008-148339 | 6/2008 |
| JP | 2010-092285 | 4/2010 |
| WO | 2001001262 | 1/2001 |

OTHER PUBLICATIONS

Japanese Office Action dated Jun. 21, 2016 for corresponding Japanese Patent Application No. 2015-527089, with Partial English Translation, 3 pages.

* cited by examiner

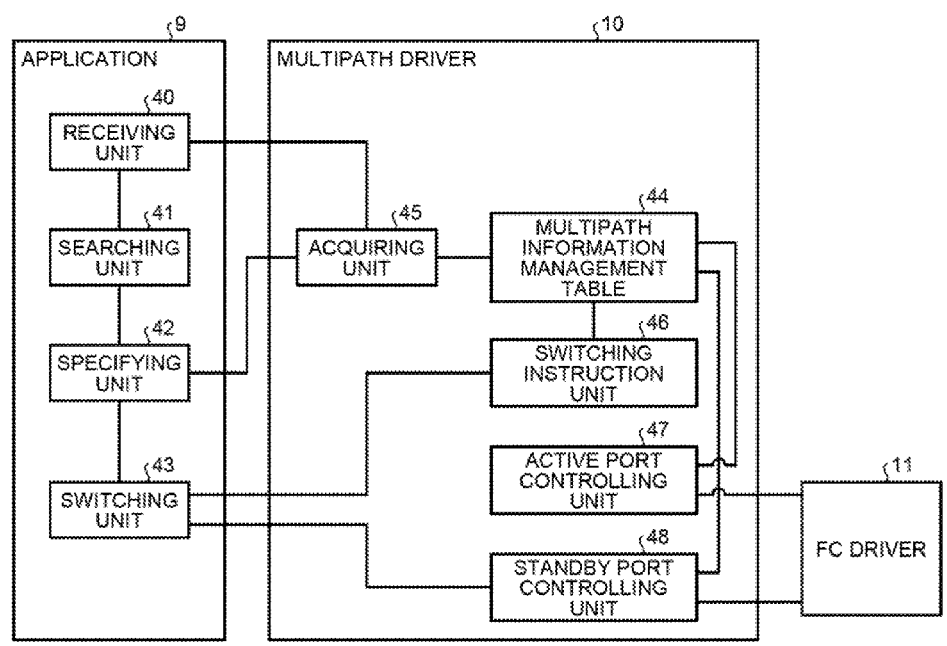

INFORMATION PROCESSING DEVICE, PORT CONTROL METHOD, AND COMPUTER-READABLE RECORDING MEDIUM

CROSS-REFERENCE TO RELATED APPLICATION

This application is a continuation application of International Application No. PCT/JP2013/069328, filed on Jul. 16, 2013 and designating the U.S., the entire contents of which are incorporated herein by reference.

FIELD

The embodiments discussed herein are related to an information processing device, a computer-readable recording medium, and a port control method.

BACKGROUND

A technology that allows continuous communication even if a failure occurs on a communication path is known. This is possible by providing a redundant communication path between the devices. As an example of such a technology, an information processing device that includes a plurality of fiber channel cards with a plurality of ports, and that communicates with a storage device via a fiber channel in a multipath configuration is known.

Such an information processing device, for example, uses two ports on one fiber channel card as active ports, and two ports on another fiber channel card as standby ports. When a failure occurs on one of the active ports, the information processing device switches the faulty active port to a standby port. Between the standby ports on the other fiber channel card, the information processing device switches the standby port connected to the storage device, to which the faulty active port is also connected, to an active port. The information processing device then continuously communicates with the storage device via the active port.

Patent Document 1: Japanese Laid-open Patent Publication No. 2000-339105

Patent Document 2: International Publication Pamphlet No. WO 2001/001262

However, in the technology that communicates with the storage device via the fiber channel in a multipath configuration as described above, when the faulty active port is switched to a standby port, the active port and the standby port are both on a single fiber channel card. Hence, there is a problem in that it is not possible to replace the fiber channel card with the faulty port, while the information processing device is in operation.

When the fiber channel card with the faulty port is replaced or when the cable connected to the active port is disengaged, while the active port and the standby port are both on the fiber channel card, the communication between the information processing device and the storage device will be temporarily interrupted.

SUMMARY

According to an aspect of the embodiments, an information processing device includes: a plurality of communication units that each has a plurality of ports and is replaceable; and a processor configured to execute a process including: specifying an active port mounted on one of the communication units on which a faulty active port is also mounted; and switching the active port specified at the specifying to a standby port.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram for explaining a functional configuration of the application and the multipath driver according to the first embodiment;

FIG. 7 is a diagram for explaining an example of information stored in a multipath information management table;

DESCRIPTION OF EMBODIMENTS

Preferred embodiments will be explained with reference to accompanying drawings. However, the disclosed technology is not to be limited to the disclosed embodiments. The exemplary embodiments may be appropriately combined in a range without contradiction.

[a] First Embodiment

Figure 1:
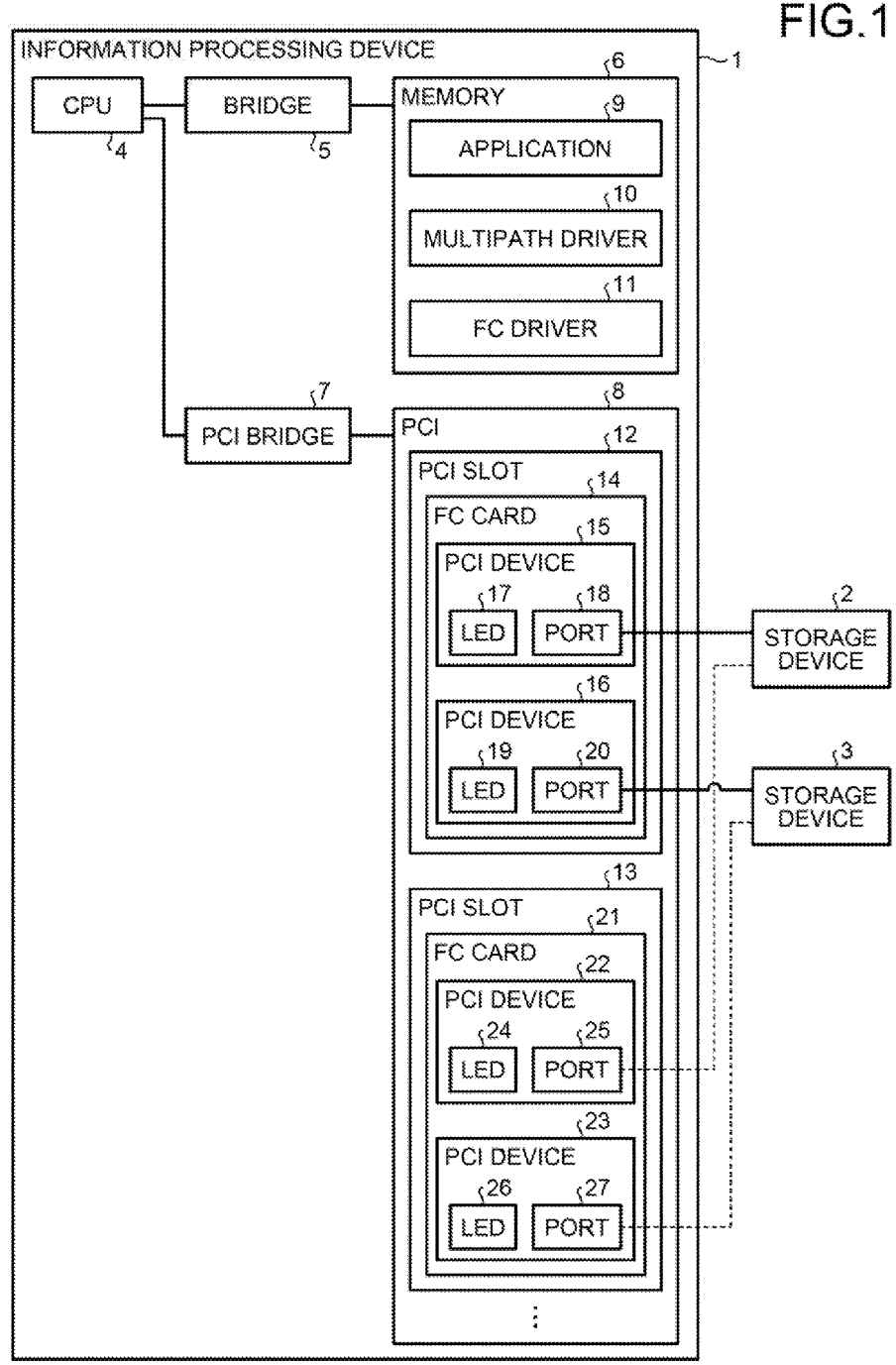
FIG. 1 is a diagram for explaining an information processing device according to a first embodiment.

In the following first embodiment, an information processing device according to the present invention will be described with reference to FIG. 1. FIG. 1 is a diagram for explaining an information processing device according to the first embodiment. As illustrated in FIG. 1, an information processing device 1 is connected to a plurality of storage devices 2 and 3 via a fiber channel (FC). The information processing device 1 includes a central processing unit (CPU) 4, a bridge 5, memory 6, a peripheral component interconnect (PCI) bridge 7, and a PCI 8. In the example illustrated in FIG. 1, the memory 6 stores therein an application 9, a multipath driver 10, and an FC driver 11.

The PCI 8 has a plurality of PCI slots 12 and 13. Here, an FC card 14 is connected to the PCI slot 12, and an FC card 21 is connected to the PCI slot 13. The FC card 14 has a plurality of PCI devices 15 and 16. The PCI device 15 has a light emitting diode (LED) 17 and a port 18. The PCI device 16 has an LED 19 and a port 20. The FC card 21 has PCI devices 22 and 23. The PCI device 22 has an LED 24 and a port 25. The PCI device 23 has an LED 26 and a port 27.

The PCI device 15 is connected to the storage device 2 via the port 18. The PCI device 16 is connected to the storage device 3 via the port 20. The PCI device 22 is connected to the storage device 2 via the port 25. The PCI device 23 is connected to the storage device 3 via the port 27.

Here, in FIG. 1, the active FC is illustrated in a straight line, and the standby FC is illustrated in a dotted line. In other words, the information processing device 1 uses the ports 18 and 20 as active ports, and uses the ports 25 and 27 as standby ports. The information processing device 1, for example, when a failure occurs on the port 18, switches the port 18 to a standby port, and switches the port 25 to an active port.

In FIG. 1, the FC cards 14 and 21 are connected to the PCI slots 12 and 13, among the slots on the PCI 8. However, the information processing device 1 also has PCI slots to which an FC card and other PCI devices are connected. In the following description, the PCI devices 16, 22, and 23 are expected to exhibit the same function as that of the PCI device 15. Hence, the explanation thereof will be omitted.

The storage devices 2 and 3 are storage devices to which the information processing device 1 stores data used for various processes. More specifically, the storage devices 2 and 3 are connected to the information processing device 1 via an FC in a multipath configuration. The information processing device 1 and each of the storage devices 2 and 3 are redundantly connected through the active and standby ports.

The CPU 4 is an arithmetic processing device that executes various types of arithmetic processing. For example, the CPU 4 reads and executes the application 9, the multipath driver 10, and the FC driver 11 from the memory 6 via the bridge 5. By doing so, the CPU 4 executes various types of processing such as accessing the storage devices 2 and 3.

The bridge 5, for example, is a north bridge, and according to an instruction from the CPU 4, reads and writes various types of data stored in the memory 6. The memory 6 is a storage device that stores therein various types of data used when the CPU 4 performs arithmetic processing. The memory 6, for example, is a dual inline memory module (DIMM). The PCI bridge 7, for example, is a south bridge that controls input and output (I/O).

The application 9 is an application that performs port control, and according to an instruction of a user, executes various controls. The multipath driver 10 is a driver that controls the multipath configuration of the information processing device 1 and the storage devices 2 and 3. For example, the multipath driver 10 is a set of application program interfaces (APIs) that controls the multipath. The FC driver 11 is a driver that controls the FC cards 14 and 21. For example, the FC driver 11 has an active driver that controls an FC card with an active port, and a standby driver that controls an FC card with a standby port.

The FC cards 14 and 21 are cards that can be replaced with other cards when a failure occurs. The FC card 14 connected to the PCI slot 12 transmits and receives data to and from the storage devices 2 and 3 via the FC. The LED 17 is an LED that indicates whether the port 18 is transmitting or receiving data. When a small computer system interface (SCSI) command is issued to the port 18, the LED 17 is turned on or flickers at high speed. Similarly, the other LEDs 19, 24, and 26 are also turned on or flicker at high speed, when a SCSI command is issued to the ports 20, 25, and 27. Each of the ports 18, 20, 25, and 27 is a physical interface that connects an FC cable.

Here, a PCI address, which is a physical address that specifies each of the ports 18, 20, 25 and 27, is applied to each of the ports 18, 20, 25, and 27 illustrated in FIG. 1. In below, the PCI address assigned to each of the ports 18, 20, 25, and 27 will be described with reference to FIG. 2.

Figure 2:
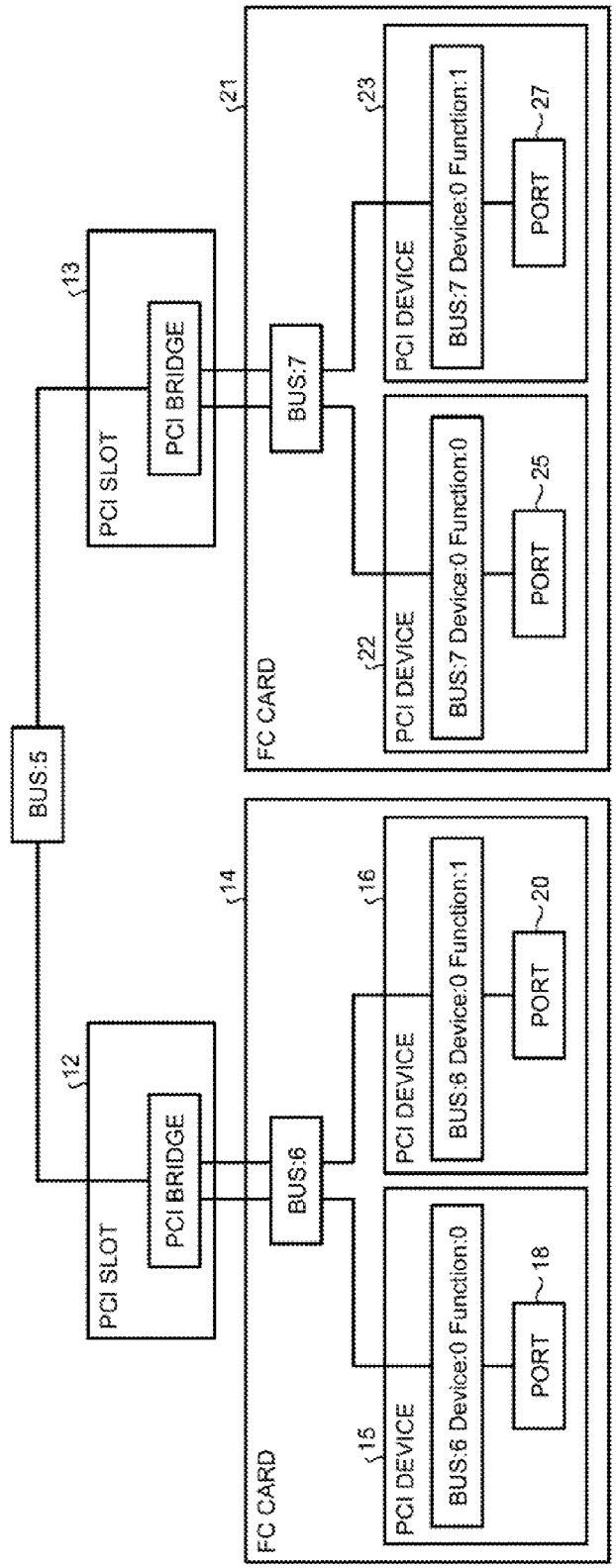
FIG. 2 is a diagram for explaining an example of a PCI address assigned to each port.

FIG. 2 is a diagram for explaining an example of a PCI address assigned to each port. For example, a PCI address that includes a bus number, a device number, and a function number is applied to each of the ports 18, 20, 25, and 27. Here, the bus number is a number to identify a bus to which an FC card with a port is connected. The device number is a number to identify a device connected to the same bus. The function number is a number to identify the function provided by the same device. In the example illustrated in FIG. 2, the bus number is indicated with "BUS:" followed by a numeral, the device number is indicated with "Device:" followed by a numeral, and the function number is indicated with "Function:" followed by a numeral.

For example, in the example illustrated in FIG. 2, the PCI slot 12 and the PCI slot 13 are connected to a bus with the bus number "BUS:5". The PCI slot 12 has a PCI bridge to which a bus with the bus number "BUS:6" is connected. The ports 18 and 20 are connected to the bus with the bus number "BUS:6". The PCI slot 13 has a PCI bridge and to which a bus with the bus number "BUS:7" is connected. The ports 25 and 27 are connected to the bus with the bus number "BUS:7".

In such a case, for example, the PCI address of "BUS:6 Device:0 Function:0" is applied to the port 18, and the PCI address of "BUS:6 Device:0 Function:1" is assigned to the port 20. The PCI address of "BUS:7 Device:0 Function:0" is assigned to the port 25, and the PCI address of "BUS:7 Device:0 Function:1" is assigned to the port 27.

In other words, the FC cards 14 and 21 are connected to respective buses to which different bus numbers are assigned. Thus, the PCI address including the same bus number is applied to the ports mounted on the same FC card, such as the ports 18 and 20. To be more specific, the PCI addresses including the bus number "BUS:6" are assigned to the ports 18 and 20, and the PCI addresses including the bus number "BUS:7" are assigned to the ports 25 and 27.

When a failure occurs on an active port, the related information processing device switches the faulty active port to a standby port, and automatically switches the standby port to an active port. However, in the multipath configuration, in which a plurality of ports are mounted on a single FC card, an active port and a standby port are both included on a single FC card. As a result, it is difficult to replace the FC card.

Figure 3:
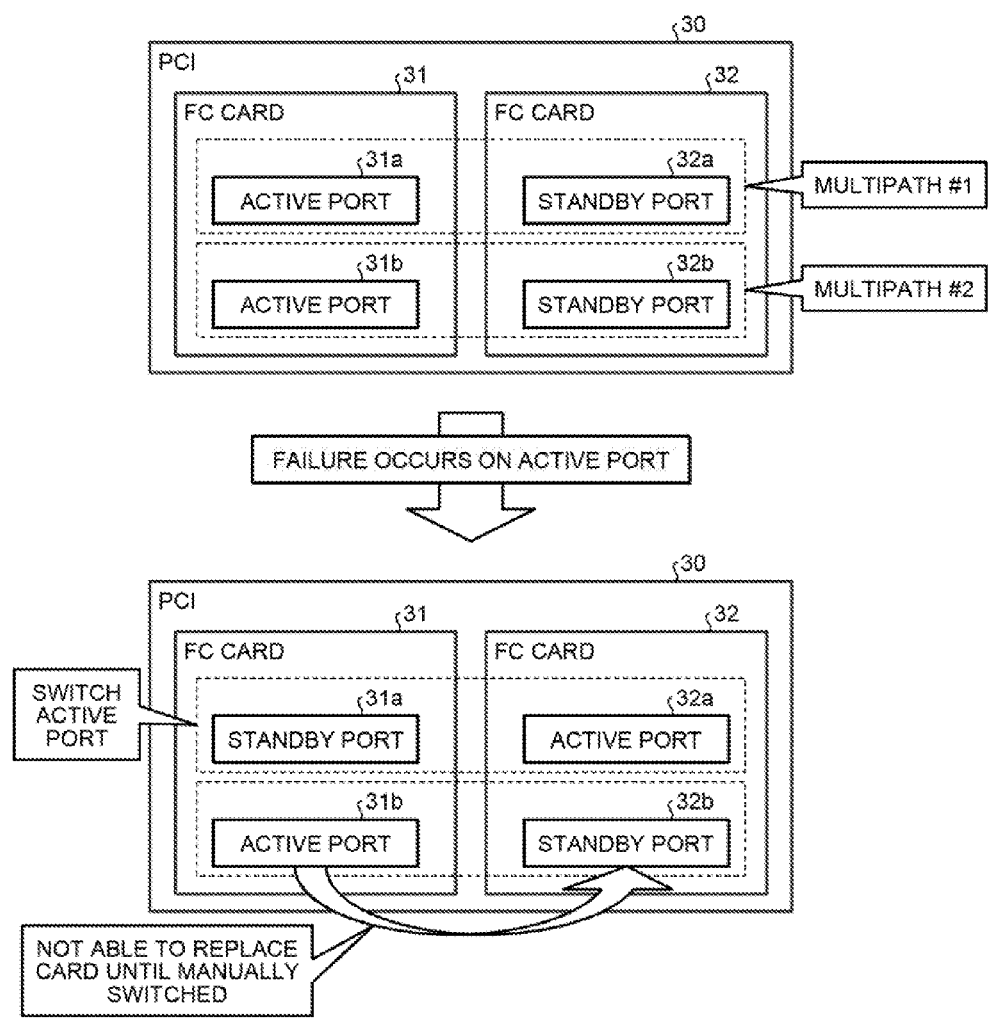
FIG. 3 is a diagram for explaining how an active port is switched to a standby port.

FIG. 3 is a diagram for explaining how an active port is switched to a standby port. For example, a related PCI 30 illustrated in FIG. 3 has FC cards 31 and 32. The FC card 31 has two ports 31a and 31b. The FC card 32 has two ports 32a and 32b. Here, the ports 31a and 31b of the FC card 31 operate as active ports 31a and 31b, and the ports 32a and 32b of the FC card 32 operate as standby ports 32a and 32b.

The active port 31a and the standby port 32a are connected to the same storage device, and configure a multipath #1. The active port 31b and the standby port 32b are connected to the same storage device, and configure a multipath #2. In the related information processing device, when a failure occurs on the active port 31a, the active port 31a is switched to the standby port 31a, and the standby port 32a is switched to the active port 32a. However, until the active port 31b is switched to a standby port, and the standby port 32b is switched to an active port, it is not possible to replace the FC card 31.

In the related information processing device, the active port is switched manually. However, it is troublesome to manually select an active port on the FC card on which the faulty active port is also mounted, among the active ports. Because many FC cards are installed in the server and the like, it is difficult to visually identify the FC card to be replaced.

In the information processing device 1, another active port mounted on the FC card on which the faulty active port is also mounted, is replaced with a standby port. More specifically, the information processing device 1 acquires a PCI address assigned to the faulty active port. Then, the information processing device 1 specifies an active port assigned with the PCI address that has the same bus number as that of the acquired PCI address. The information processing device 1 then switches the specified active port to a standby port.

In the following, a process executed by the information processing device 1 will be described with reference to FIG. 4 and FIG. 5. First, a processing flow executed by the application 9, the multipath driver 10, and the FC driver 11 of the information processing device 1 will be described with reference to FIG. 4.

Figure 4:
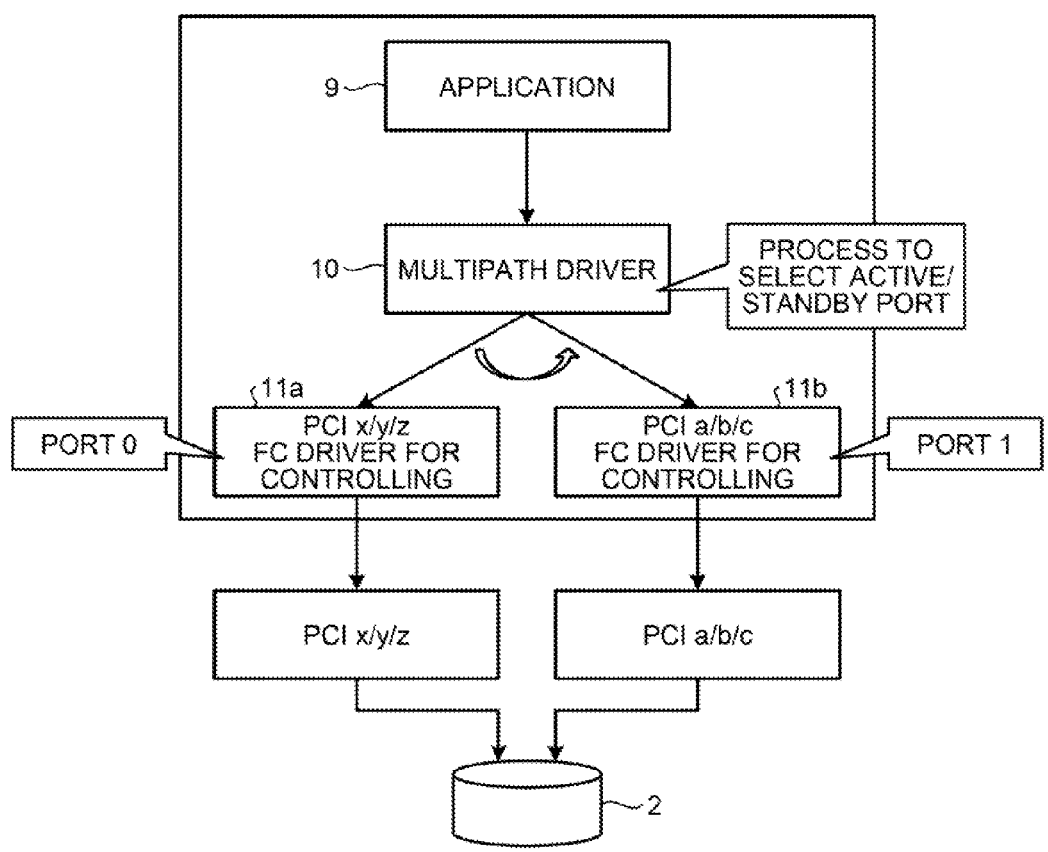
FIG. 4 is a diagram for explaining a relation among an application, a multipath driver, and an FC driver according to the first embodiment.

FIG. 4 is a diagram for explaining a relation among an application, a multipath driver, and an FC driver according to the first embodiment. In the example illustrated in FIG. 4, the information processing device 1 has a port 0 and a port 1. In the example illustrated in FIG. 4, the PCI address of the port 0 is PCI x/y/z and the PCI address of the port 1 is PCI a/b/c.

In the example illustrated in FIG. 4, the FC driver 11 operates as an FC driver 11a for controlling the FC card with the port 0, and an FC driver 11b for controlling the FC card with the port 1. The multipath driver 10 stores therein the PCI address of the port 0 and the PCI address of the port 1. The multipath driver 10 also stores therein information on which of the port 0 or the port 1 is the active port. The multipath driver 10, on receiving an instruction to issue various SCSI commands from the application 9, selects the PCI address of the active port, and issues a SCSI command to the FC driver that controls the port indicated by the selected PCI address.

For example, the multipath driver 10 stores therein information indicating that the port 0 is the active port. On receiving an instruction to issue various SCSI commands from the application, the multipath driver 10 specifies the PCI address of PCI x/y/z of the port 0, which is the active port. The multipath driver 10 then issues a SCSI command to the FC driver 11a that controls the port assigned with the specified PCI address of PCI x/y/z, in other words, the port 0. As a result, the storage device 2 is accessed from the port 0 whose PCI address is PCI x/y/z.

When the active port is switched to the port 1, on receiving an instruction to issue various SCSI commands from the application 9, the multipath driver 10 specifies the PCI address of PCI a/b/c of the port 1. The multipath driver 10 then issues a SCSI command to the FC driver 11b that controls the specified PCI address of PCI a/b/c. As a result, the storage device 2 is accessed from the port 1 whose PCI address is PCI a/b/c.

Figure 5:
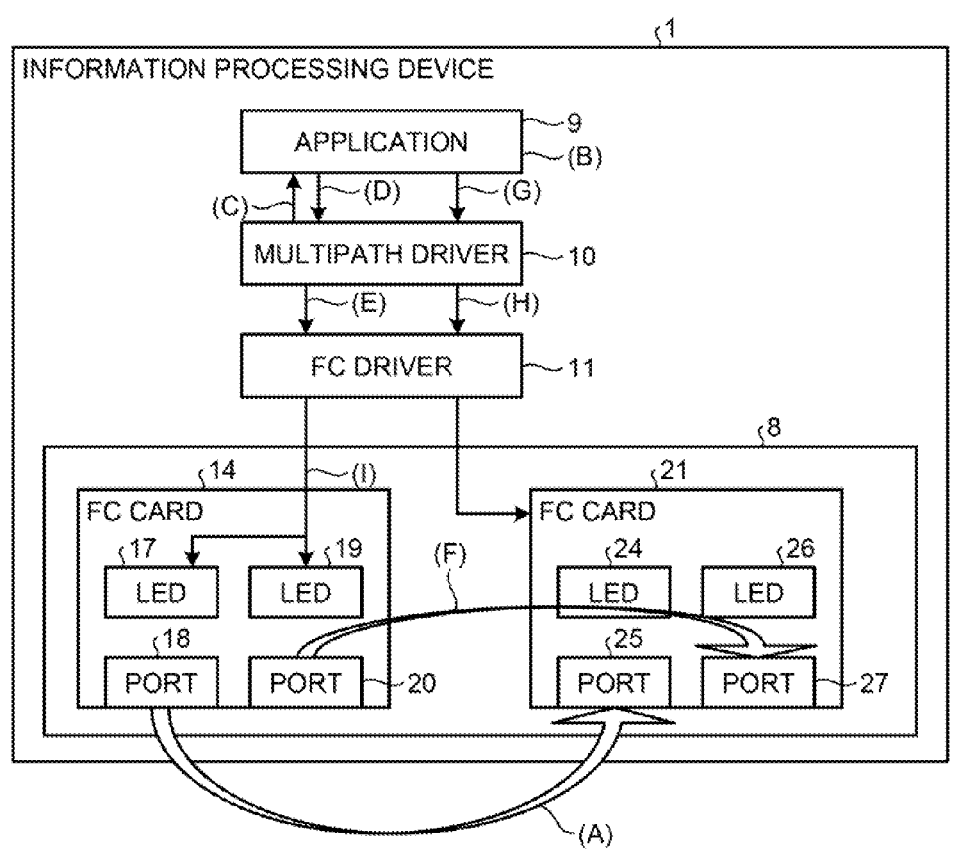
FIG. 5 is a diagram for explaining a process executed by the application and the multipath driver according to the first embodiment.

With reference to FIG. 5, a processing flow in which the application 9 and the multipath driver 10 specify the active port on the FC card on which the faulty port is also mounted, and switch the specified active port to a standby port will now be described. FIG. 5 is a diagram for explaining a process executed by the application and the multipath driver according to the first embodiment. In the following explanation, the ports 18 and 20 operate as the active ports and the ports 25 and 27 operate as the standby ports, and a processing flow executed by the information processing device 1 when a failure occurs on the port 18, will be described.

For example, as illustrated in A in FIG. 5, when a failure occurs on the port 18, the multipath driver 10 automatically switches the port 18 from the active port to a standby port, and switches the port 25 from the standby port to an active port. Here, the application 9 illustrated in B in FIG. 5, on receiving an input of the faulty port 18 from a user, searches the PCI bus, and acquires the PCI address of the device assigned with the PCI address that has the same bus number as that of the port 18. The acquired PCI address not only includes the PCI address of the port 20 on the FC card 14 on which the port 18 is also mounted, but also includes the PCI addresses of various devices on the FC card 14.

The multipath driver 10 also manages logical path information on the configuration of the logical path used as an active path. Thus, as illustrated in C in FIG. 5, the application 9 acquires the logical path information from the multipath driver 10. The application 9 then compares between the logical path information and the acquired PCI address, and specifies the port mounted on the FC card on which the port 18 is also mounted, in other words, the port 20. Then, as illustrated in D in FIG. 5, the application 9 instructs the multipath driver 10 to change the specified port 20 to a standby port.

As a result, the multipath driver 10 changes the configuration of the logical path so that the port 20 becomes the standby port and the port 27 becomes the active port. When the active port is accessed, as illustrated in E in FIG. 5, the multipath driver 10 issues a SCSI command to the FC driver 11 that controls the ports 25 and 27. As a result, the FC driver 11 issues the SCSI command to the active ports 25 and 27. In this manner, as illustrated in F in FIG. 5, the information processing device 1 switches the port 20 to the standby port, and switches the standby port 27, which configures the same logical path as that of the port 20, to the active port.

As illustrated in G in FIG. 5, to easily and visually identify the FC card to be replaced, the application 9 instructs the multipath driver 10 to turn on the LEDs 17 and 19 on the FC card 14. More specifically, the application 9 instructs the multipath driver 10 to continuously issue SCSI commands not accompanied by data access, such as TEST UNIT READY and REQUEST SENSE, to an LED path on the FC card to be replaced. As a result, as illustrated in H in FIG. 5, the multipath driver 10 issues the SCSI command to the FC driver 11, and as illustrated in I in FIG. 5, the FC driver 11 causes the LEDs 17 and 19 on the FC card 14 to flicker at a certain pattern or to turn on. Hence, the information processing device 1 allows a user to easily and visually identify the card to be replaced.

Next, with reference to FIG. 6, a functional configuration of the application 9 and the multipath driver 10 executed by the CPU 4 will be described. FIG. 6 is a diagram for explaining a functional configuration of the application and the multipath driver according to the first embodiment. The application 9 includes a receiving unit 40, a searching unit 41, a specifying unit 42, and a switching unit 43. The multipath driver 10 includes a multipath information management table 44, an acquiring unit 45, a switching instruction unit 46, an active port controlling unit 47, and a standby port controlling unit 48.

First, with reference to FIG. 7, information stored in the multipath information management table 44 will be described. FIG. 7 is a diagram for explaining an example of information stored in a multipath information management table. The multipath information management table 44 stores therein logical path information. For example, the multipath information management table 44 stores therein the logical path information in which two ports that configure a multipath is divided into the port 0 and the port 1, and that indicates which of the port 0 or the port 1 is the active port.

More specifically, in the example illustrated in FIG. 7, the multipath information management table 44 stores therein information for selecting an active port, the PCI address of the port 0, the PCI address of the port 1, the address of the access destination disk, and the like. Here, the information for selecting an active port is a diagram indicating which of the port 0 or the port 1 is the active port. In the example illustrated in FIG. 7, the information indicating that the port 0 is the active port is stored in the multipath information management table 44.

The PCI address of the port 0 is the PCI address assigned to the port 0, in other words, the active port. In the example illustrated in FIG. 7, the PCI address of the port 18 is stored. The PCI address of the port 1 is the PCI address assigned to the port 1, in other words, the standby port. In the example illustrated in FIG. 7, the PCI address assigned to the port 25 is stored. The address of the access destination disk is the addresses of the storage devices 2 and 3 to which the ports are connected, and a World Wide Name (WWN), a Target, or a logical unit number (LUN) is stored.

Although not described in FIG. 7, in the multipath information management table 44, the PCI address of the port 20 is stored as the port 0, and the PCI address of the port 27 is stored as the port 1.

Returning to FIG. 6, the receiving unit 40 receives a specification of a port, on which a failure has occurred and whose link is in a link-down state, from a user. For example, when the port 18 is in a link-down state, the receiving unit 40 receives an input of the PCI address of the port 18 from a user. In such a case, the receiving unit 40 outputs the PCI address of the port 18, whose link is in a link-down state, to the searching unit 41. The receiving unit 40 also requests the acquiring unit 45 of the multipath driver 10 for logical path information.

The searching unit 41 searches the PCI bus, and acquires the PCI address of the device connected to the PCI bus, to which the port whose link is in a link-down state is also connected. For example, the searching unit 41 acquires the PCI address of "BUS:6 Device:0 Function:0" of the port 18, from the receiving unit 40. In such a case, the searching unit 41 searches the PCI bus for all the PCI addresses whose bus number is "BUS:6", and determines whether a device is present. The searching unit 41 then generates a PCI address list of the collected PCI addresses where a device is determined to present, and outputs the PCI address list to the specifying unit 42.

For example, after the PCI bus is searched for all the PCI addresses whose bus number is "BUS:6", the searching unit 41 acquires the PCI address of "BUS:6 Device:0 Function 1" of the port 20. The searching unit 41 then outputs the PCI address of "BUS:6 Device:0 Function:1" to the specifying unit 42. The searching unit 41 not only outputs the PCI address of the port 20 but also outputs the PCI addresses of devices mounted on the FC card 14.

The specifying unit 42 specifies the port on the FC card on which the faulty port is also mounted. More specifically, the specifying unit 42 receives the PCI address list from the searching unit 41. The PCI address list includes the PCI address of the device connected to the bus to which the faulty port is also connected.

The specifying unit 42 also receives the logical path information from the multipath driver 10. Then, among the PCI addresses included in the PCI address list, the specifying unit 42 specifies the PCI address that matches with the PCI address of the active port included in the logical path information. In other words, the specifying unit 42 specifies the PCI address of the active port mounted on the FC card on which the faulty port is also mounted. The specifying unit 42 then outputs the specified PCI address to the switching unit 43.

For example, when a failure occurs on the port 18, the specifying unit 42 receives the address list including the PCI address of "BUS:6 Device:0 Function:1" of the port 20. The specifying unit 42 also acquires the logical path information illustrated in FIG. 7, from the multipath driver 10. Here, the PCI address of "BUS:6 Device:0 Function:1" of the port 20 is stored in the logical path information as the PCI address of the active port. Thus, the specifying unit 42 determines that the port 20 is the active port mounted on the FC card 21 on which the port 18 is also mounted. The specifying unit then outputs the PCI address of "BUS:6 Device:0 Function 1" of the port 20, to the switching unit 43.

The switching unit 43 switches the active port mounted on the FC card, on which the faulty port is also mounted, to a standby port. More specifically, the switching unit 43 receives the PCI address of the active port mounted on the FC card on which the faulty port is also mounted, from the specifying unit 42. The switching unit 43 then outputs the received PCI address and a switching instruction to switch the port to a standby port, to the switching instruction unit 46 of the multipath driver 10. The switching unit 43 also instructs the standby port controlling unit 48 of the multipath driver 10, to turn on the LED on the FC card with the port assigned with the received PCI address.

For example, the switching unit 43 receives the PCI address of "BUS:6 Device:0 Function 1". In such a case, the switching unit 43 outputs the PCI address of "BUS:6 Device:0 Function 1" and the switching instruction to switch the port to a standby port, to the switching instruction unit 46. The switching unit 43 also instructs the standby port controlling unit 48 to turn on the LED on the FC card.

The acquiring unit 45 acquires the logical path information. More specifically, on receiving a logical path information request from the receiving unit 40 of the application 9, the acquiring unit 45 extracts the information for selecting an active port, the PCI address of the port 0, and the PCI address of the port 1, from the multipath information management table 44. Then, the acquiring unit 45 outputs the extracted pieces of information to the specifying unit 42 of the application 9. The acquiring unit 45, for example, is implemented as an API for acquiring information indicating that acquires the logical path information.

The switching instruction unit 46 sets the active port and the standby port. For example, between the ports 18 and 25 connected to the same storage device 2, the switching instruction unit 46 sets the port 18 as the port 0 and the port 25 as the port 1. Also, between the ports 20 and 27 connected to the same storage device 3, the switching instruction unit 46 sets the port 20 as the port 0 and the port 27 as the port 1. The switching instruction unit 46 then stores the PCI addresses of the ports 18 and 20, each of which is port 0, and the PCI addresses of the ports 25 and 27, each of which is port 1, in the multipath information management table 44.

The switching instruction unit 46 also sets the port 0 as the active port, and stores the information for selecting an active port, which indicates that the port 0 is the active port, in the multipath information management table 44.

When a failure occurs on an active port and whose link is in a link-down state, among the PCI addresses stored in the multipath information management table 44, the switching instruction unit 46 changes the PCI address of the faulty active port to the PCI address of a standby port. The switching instruction unit 46, among the PCI addresses of the standby ports, changes the PCI address of the port connected to the storage device, to which the faulty port is also connected, to the PCI address of a standby port. For example, when a failure occurs on the port 18, the switching instruction unit 46 changes the PCI address of the port 18 from the PCI address of the port 0 to the PCI address of the port 1, and changes the PCI address of the port 25 from the PCI address of the port 1 to the PCI address of the port 0.

The switching instruction unit 46, on receiving the PCI address and the switching instruction from the switching unit 43, among the PCI addresses stored in the multipath information management table 44, changes the received PCI address to the PCI address of a standby port. The switching instruction unit 46 also changes the PCI address of the port connected to the storage device, to which the port assigned with the received PCI address is also connected, to the PCI address of an active port.

For example, the switching instruction unit 46, on receiving the PCI address of the port 20, changes the PCI address of the port 20 from the PCI address of the port 0 to the PCI address of the port 1. The switching instruction unit 46 also changes the PCI address of the port 27 connected to the storage device 3, to which the port 20 is also connected, from the PCI address of the port 1 to the PCI address of the port 0. The switching instruction unit 46 rewrites the multipath information management table 44 according to an instruction from a user, and is implemented as an API for switching instruction that switches the active port and the standby port.

The active port controlling unit 47 is an API for port control that issues various SCSI commands to the active port. For example, the active port controlling unit 47 receives an instruction to issue a SCSI command to read from or write to the active port, from various types of application executed by the information processing device 1, such as the application 9. In such a case, the active port controlling unit 47 acquires the PCI address of the active port from the multipath information management table 44. The active port controlling unit 47 then generates a SCSI command to the port assigned with the acquired PCI address, and outputs the generated SCSI command to the FC driver 11.

The standby port controlling unit 48 is an API for port control that issues various SCSI commands to the standby port. For example, the standby port controlling unit 48 receives an instruction to issue a SCSI command to read from or write to the standby port, from various types of application executed by the information processing device 1, such as the application 9. In such a case, the standby port controlling unit 48 acquires the PCI address of the standby port from the multipath information management table 44. The standby port controlling unit 48 then generates a SCSI command to the port assigned with the acquired PCI address, and outputs the generated SCSI command to the FC driver 11.

On receiving an instruction to turn on the LED of the FC card from the switching unit 43, the standby port controlling unit 48 acquires the PCI address assigned to the standby port, from the multipath information management table 44. The standby port controlling unit 48 then outputs a SCSI command not accompanied by data access to the acquired PCI address at a predetermined interval, to the FC driver 11, and turns on the LED. For example, when the PCI addresses of the ports 18 and 20 are stored in the multipath information management table 44 as the PCI address of the port 1, the standby port controlling unit 48 outputs the SCSI command not accompanied by data access to the ports 18 and 20, to the FC driver 11.

Figure 8:
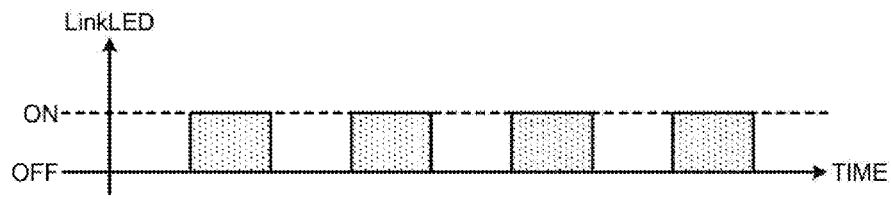
FIG. 8 is a diagram for explaining an example of a pattern for issuing a SCSI command to turn on an LED.

FIG. 8 is a diagram for explaining an example of a pattern for issuing a SCSI command to turn on an LED. For example, each of the LEDs 17, 19, 24, and 26 is turned on or turned off at a timing that matches the physical level such as the link speed. Hence, when a SCSI command accompanied by file access such as READ is issued, the LED that indicates the state of the active port repeats the ON and OFF states as indicated by the shaded portions in FIG. 8, and flickers at high speed. In this manner, to easily differentiate with the LED that indicates the state of the active port, the standby port controlling unit 48 continuously issues the SCSI commands not accompanied by file access at the timing synchronized with the link speed. As a result, the LED of the FC card that has the standby port, in other words, the LED of the FC card to be replaced, as illustrated by a dotted line in FIG. 8, maintains the ON state and keeps the LED turned on. Thus, the user can easily identify the FC card to be replaced.

Figure 9:
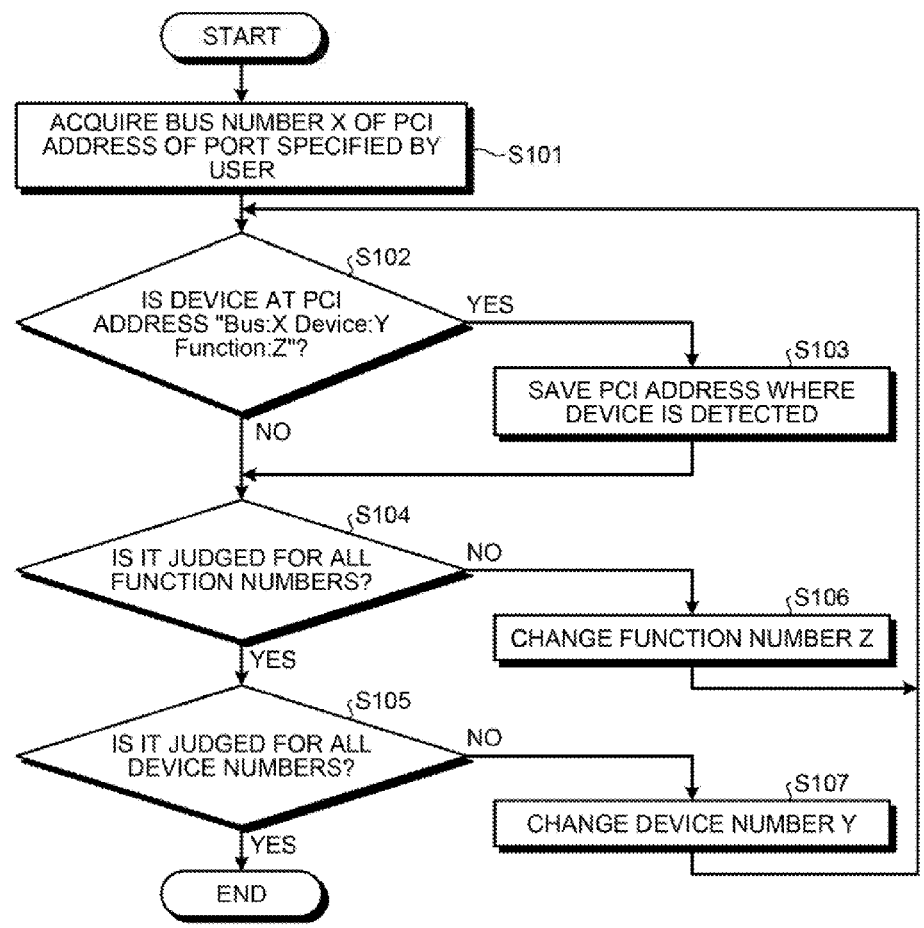
FIG. 9 is a flowchart for explaining a processing flow for searching a PCI bus.

With reference to FIG. 9, a processing flow for searching a PCI bus executed by the application 9 will now be described. FIG. 9 is a flowchart for explaining a processing flow for searching a PCI bus. For example, the application 9 acquires the bus number "X" from the PCI address of the port specified by a user (step S101). The application 9 then determines whether a device is present at the PCI address of "BUS:X Device:Y Function:Z" (step S102). Here, the initial value of a value "Y" of the device number and a value "Z" of the function number is "0".

When a device is present at the PCI address of "BUS:X Device:Y Function:Z" (Yes at step S102), the application 9 saves the PCI address where the device is detected (step S103). When a device is not present at the PCI address of "BUS:X Device:Y Function:Z" (No at step S102), the application 9 skips step S103.

The application 9 also determines whether the presence of a device is judged for all the function numbers (step S104). For example, the application 9 determines whether the value "Z" of the function number is "0x1F". When the presence of a device is judged for all the function numbers (Yes at step S104), the application 9 judges whether the presence of a device is judged for all the device numbers (step S105). For example, the application 9 determines whether the value "Y" of the device number is "0x1F".

When the presence of a device is judged for all the device numbers (Yes at step S105), the application 9 finishes the processing. When the presence of a device is not judged for all the function numbers (No at step S104), the application 9 changes the value of the function number (step S106). For example, the application 9 adds 1 to the value "Z" of the function number. The application 9 then executes step S102. When the presence of a device is not judged for all the device numbers (No at step S105), the application 9 changes the value of the device number (step S107). For example, the application 9 adds 1 to the value "Y" of the device number. The application 9 then executes step S102.

Figure 10:
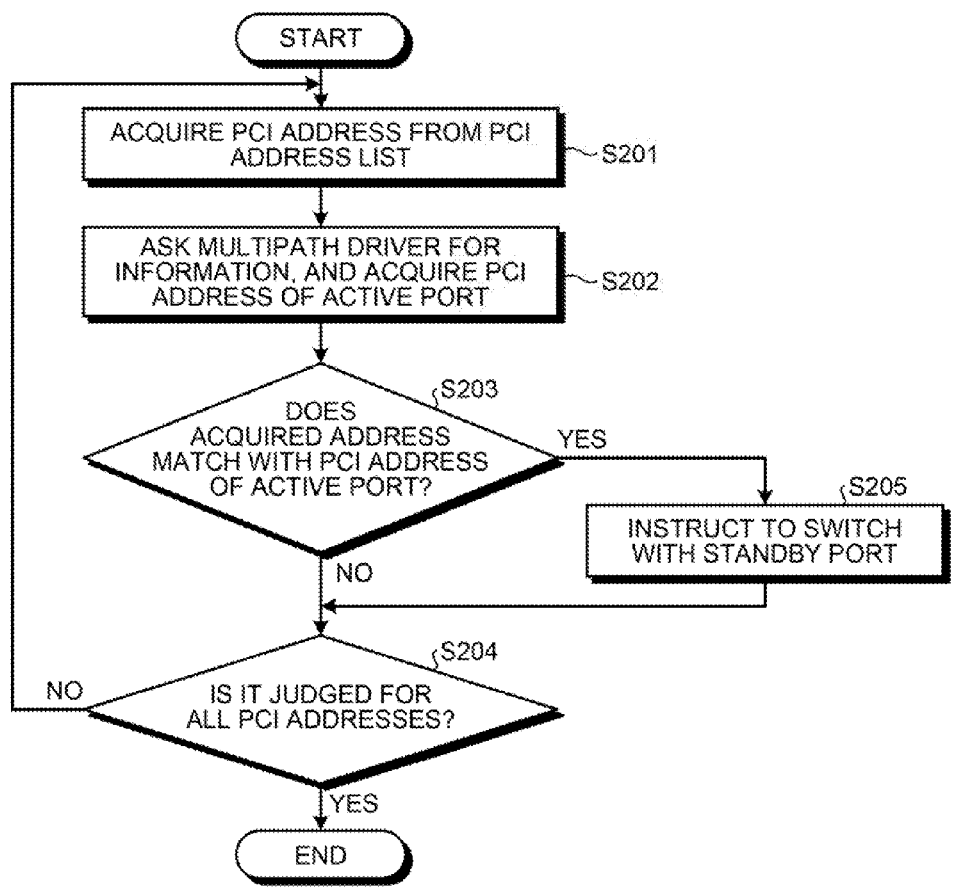
FIG. 10 is a flowchart for explaining a processing flow executed by the application according to the first embodiment.

With reference to FIG. 10, a processing flow when the application 9 instructs to switch an active port to a standby port will now be described. FIG. 10 is a flowchart for explaining a processing flow executed by the application according to the first embodiment. For example, the application 9 acquires one PCI address, which is not determined to match the PCI address of the active port, from the PCI address list including the PCI address stored at step S103 in FIG. 9 (step S201). The application 9 then asks the multipath driver 10 for information, and acquires the PCI address of the active port (step S202). More specifically, the application 9 acquires the logical path information from the multipath driver 10, and acquires the PCI address of the active port from the acquired logical path information.

The application 9 then determines whether the PCI address acquired at step S201 matches with the PCI address of the active port acquired at step S202 (step S203). When the acquired PCI address does not match with the PCI address of the active port (No at step S203), the application 9 executes the following process. In other words, the application 9 determines whether all the PCI addresses included in the PCI address list are judged to match the PCI address of the active port (step S204).

When all the PCI addresses included in the PCI address list are judged to match the PCI address of the active port (Yes at step S204), the application 9 finishes the process. On the other hand, when all the PCI addresses included in the PCI address list are not judged to match the PCI address of the active port (No at step S204), the application 9 executes step S201. When the acquired PCI address matches with the PCI address of the active port (Yes at step S203), the application 9 instructs the multipath driver 10 to switch the acquired PCI address with a standby port (step S205).

Figure 11:
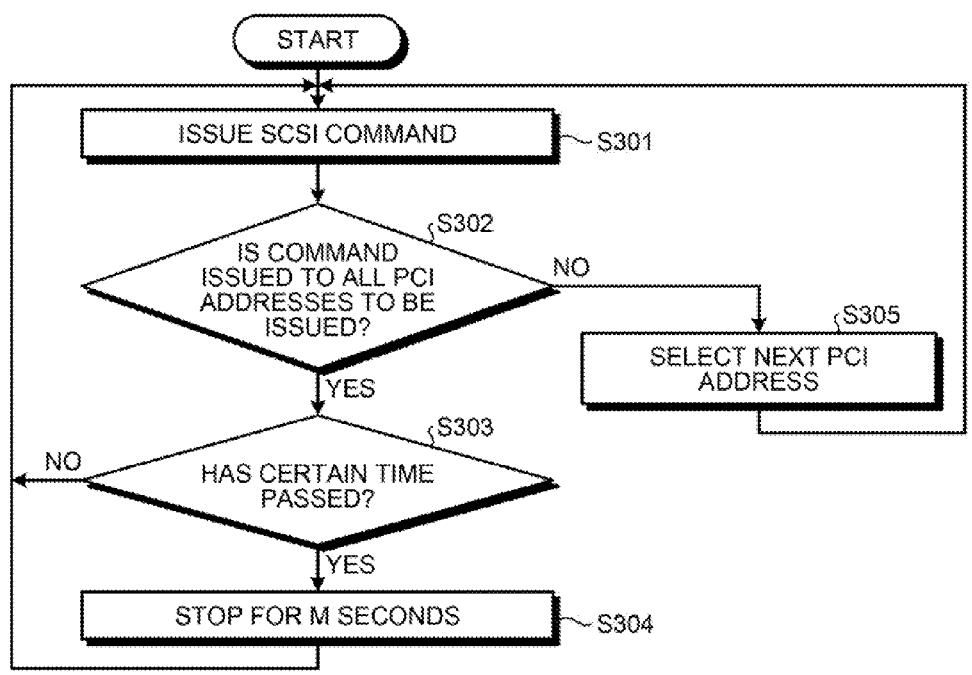
FIG. 11 is a flowchart for explaining a processing flow to turn on an LED.

With reference to FIG. 11, a processing flow in which the multipath driver 10 issues a SCSI command to the FC card to be replaced and turns on an LED, will now be described. FIG. 11 is a flowchart for explaining a processing flow to turn on an LED. The example illustrated in FIG. 11 describes a processing flow when the multipath driver 10 turns on the LED of the FC card to be replaced at a certain pattern.

For example, the multipath driver 10 issues a SCSI command such as REQUEST SENSE (step S301). The multipath driver 10 then determines whether the SCSI command is issued to all the PCI addresses to be issued, in other words, to all the PCI addresses of the standby port (step S302). When the SCSI command is issued to all the PCI addresses to be issued (Yes at step S302), the multipath driver 10 determines whether a certain time such as N seconds has passed (step S303).

When N seconds have not passed (No at step S303), the multipath driver 10 executes step S301. When N seconds have passed (Yes at step S303), the multipath driver 10 stops the processing for M seconds (step S304), and then executes step S301. When the SCSI command is not issued to all the PCI addresses to be issued (No at step S302), the multipath driver 10 selects the next PCI address to be issued (step S305), and executes step S301. As a result, the LED on the FC card to be replaced repeats a pattern of turning on for N seconds and turning off for M seconds.

Effects of Information Processing Device 1

As described above, the information processing device 1 includes the ports 18 and 20, the replaceable FC card 14, the ports 25 and 27, and the replaceable FC card 21. The information processing device 1, when a failure occurs on the active port, specifies another active port mounted on the FC card on which the faulty active port is also mounted. For example, the information processing device 1, when the ports 18 and 20 are active ports, and when a failure occurs on the port 18, specifies the port 20, which is another active port mounted on the FC card 14 on which the port 18 is also mounted. The information processing device 1 then switches the specified port to a standby port. Thus, the information processing device 1, for example, can eliminate the state that the active port and the standby port are both mounted on the FC card 14. Consequently, it is possible to easily replace the faulty FC card, while the information processing device 1 is in operation.

The PCI address including the bus number, the device number, and the function number is applied to each of the ports 18, 20, 25, and 27. The information processing device 1 stores therein the PCI address assigned to the active port. The information processing device 1 then searches the PCI bus, and searches a device assigned with the PCI address including the same bus number as that included in the PCI address of the faulty active port. The information processing device 1, among the PCI addresses of the device being searched, specifies the PCI address that matches with the PCI address of the active port being stored. As a result, the information processing device 1 can specify the active port on the FC card on which the faulty active port is also mounted.

The information processing device 1 switches the active port to a standby port. In addition, the information processing device 1 switches the standby port on another FC card, which is different from the FC card on which the faulty active port is mounted, to a new active port. Consequently, the information processing device 1 can switch the active port, while maintaining the communication with the storage devices 2 and 3.

The FC cards 14 and 21 include the LEDs 17, 19, 24, and 26 that indicate whether each of the ports 18, 20, 25, and 27 is carrying out communication. The information processing device 1, when the specified active port is switched to the standby port, turns on the LED of the FC card on which the faulty active port is also mounted, at a certain pattern.

For example, when a failure occurs on the active port 18, the information processing device 1 switches the port 18 to a standby port, and specifies the active port 20 mounted on the FC card 14 on which the port 18 is also mounted. The information processing device 1 then switches the active port 20 to a standby port, and turns on the LEDs 17 and 19 on the FC card 14 on which the port 18 is mounted, at a certain pattern. As a result, the information processing device 1 allows a user to easily and visually identify the FC card to be replaced.

[b] Second Embodiment

Although the embodiment of the present invention has been described in detail, it is understood that the various changes, substitutions, and alterations could be made hereto without departing from the spirit and scope of the invention. In the following, another embodiment included in the present invention will be described as a second embodiment.

1. Ports on the FC Card

In the first embodiment described above, each of the FC cards 14 and 21 has two ports. However, the embodiment is not limited thereto. For example, the FC cards 14 and 21 may have three or more ports. Even if the FC cards 14 and 21 have three or more ports, the information processing device 1 can switch the active port on the FC card to be replaced to a standby port, by executing the same processing as that described above. The information processing device 1 may also have an optional number of FC cards. In other words, the information processing device may have three or more FC cards.

2. Device with which the Information Processing Device Communicates

In the examples described above, the information processing device 1 communicates with the storage devices 2 and 3. However, the embodiment is not limited thereto. In other words, the information processing device 1 can communicate with another information processing device through multipath, not only by the FC card, but for example, via a LAN card. In such a case, with the processing described above, the active port of the LAN card to be replaced may be switched to a standby port. In this manner, when the information processing device 1 includes a plurality of replaceable communication devices that have a plurality of ports, the active port of the communication device can be switched to a standby port by using the processing described above, regardless of the communication standard. As a result, it is possible to easily replace the communication device.

3. Configuration of the Information Processing Device 1

In the first embodiment described above, the functions of the units 40 to 48 illustrated in FIG. 6 are exhibited, when the CPU 4 executes the application 9, the multipath driver 10, and the FC driver 11. However, the embodiment is not limited thereto, and for example, the information processing device 1 may include a micro-processing unit (MPU) and an application specific integrated circuit (ASIC) that exhibit the same functions as those of the multipath driver 10.

The application 9 and the multipath driver 10 described in the first embodiment can be realized by executing prepared computer programs with a computer such as a personal computer and a work station. The computer programs may be distributed via a network such as the Internet. The computer programs may be recorded in a computer-readable recording medium such as a hard disk, a flexible disk (FD), compact disc read-only memory (CD-ROM), a magneto optical disc (MO), or a digital versatile disc (DVD). The computer programs may also be executed by being read out from the recording medium by the computer.

According to an aspect of the present invention, it is possible to easily replace the faulty fiber channel card, while the information processing device is in operation.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
a plurality of communication units that each includes a plurality of ports and is replaceable;
a memory that stores addresses assigned to active ports among addresses assigned to ports, each of the addresses including a bus identifier that identifies a bus to which a communication unit is connected, a device identifier that identifies a device connected to a same bus, and a function identifier that identifies a function provided by a same device; and
a processor coupled to the memory, the processor executes a process including:
searching ports each of which is assigned with an address including a bus identifier that is a same bus identifier included in an address assigned to the faulty active port, the searching determining whether a device is present at each of the searched ports;
specifying, among the searched ports at each of which a device is determined to be present at the searching, a port, as an active port mounted on one of the communication units on which a faulty active port is also mounted, assigned with an address stored in the memory; and
switching the active port specified at the specifying to a standby port.

2. The information processing device according to claim 1, wherein the switching includes switching the active port specified at the specifying to a standby port, and switching a standby port mounted on a communication unit different from the communication unit that includes the active port, to a new active port.

3. The information processing device according to claim 1, wherein
the communication unit includes an LED that indicates whether communication is performed via each port, the process further including,
turning on the LED of the communication unit that includes the faulty active port at a certain pattern, when the active port specified at the specifying is switched to a standby port at the switching.

4. A non-transitory computer-readable recording medium storing an information processing program that causes a computer to execute a process comprising:
searching, among a plurality of communication devices that each includes a plurality of ports and is replaceable, ports each of which is assigned with an address including a bus identifier that is a same bus identifier included in an address assigned to the faulty active port, the searching determining whether a device is present at each of the searched ports, the address including a bus identifier that identifies a bus to which a communication unit is connected, a device identifier that identifies a device connected to a same bus, and a function identifier that identifies a function provided by a same device;
specifying, among the searched ports at each of which a device is determined to be present at the searching, a port, as another active port mounted on one of the communication units on which a faulty active port is also mounted, assigned with an address stored in a storage unit storing addresses assigned to active ports among addresses assigned to ports; and
switching the specified active port to a standby port.

5. A port control method comprising:
searching, among a plurality of communication devices that each includes a plurality of ports and is replaceable, ports each of which is assigned with an address including a bus identifier that is a same bus identifier included in an address assigned to the faulty active port, by a processor, the searching determining whether a device is present at each of the searched ports, the address including a bus identifier that identifies a bus to which a communication unit is connected, a device identifier that identifies a device connected to a same bus, and a function identifier that identifies a function provided by a same device;

specifying, among the searched ports at each of which a device is determined to be present at the searching, a port, as another active port mounted on one of the communication units on which a faulty active port is also mounted, assigned with an address stored in a storage unit storing addresses assigned to active ports among addresses assigned to ports, by the processor; and switching the specified active port to a standby port, by the processor.

* * * * *